United States Patent
Thompson et al.

(10) Patent No.: US 10,609,522 B1
(45) Date of Patent: Mar. 31, 2020

(54) MITIGATING ECHO AND SPURIOUS AUDIO NOISES IN RADIO COMMUNICATION SYSTEMS

(71) Applicant: Eagle Technology, LLC, Melbourne, FL (US)

(72) Inventors: Allen Thompson, Lynchburg, VA (US); Stephen Welsch, Lynchburg, VA (US)

(73) Assignee: EAGLE TECHNOLOGY, LLC, Melbourne, FL (US)

( * ) Notice: Subject to any disclaimer, the term of this patent is extended or adjusted under 35 U.S.C. 154(b) by 0 days.

(21) Appl. No.: 16/363,683

(22) Filed: Mar. 25, 2019

(51) Int. Cl.
*H04W 4/10* (2009.01)
*G06F 3/16* (2006.01)
*H04L 29/06* (2006.01)

(52) U.S. Cl.
CPC .............. *H04W 4/10* (2013.01); *G06F 3/165* (2013.01); *H04L 63/0428* (2013.01)

(58) Field of Classification Search
CPC ......... H04W 88/02; H04W 4/10; H04W 4/21; H04W 76/45; H04W 4/08; H04W 52/0245; H04W 92/18
See application file for complete search history.

(56) References Cited

U.S. PATENT DOCUMENTS

| 7,495,518 | B1 | 2/2009 | Lee et al. | |
| 8,843,088 | B2 | 9/2014 | van Zelm et al. | |
| 9,667,284 | B1* | 5/2017 | Gean | H04W 4/10 |
| 2004/0100330 | A1 | 5/2004 | Chandler | |
| 2016/0094960 | A1* | 3/2016 | Wong | H04W 4/10 370/277 |
| 2018/0152815 | A1* | 5/2018 | Pai | H04W 52/0216 |
| 2019/0171740 | A1* | 6/2019 | Sabripour | G08B 27/001 |

* cited by examiner

*Primary Examiner* — Keith Ferguson
(74) *Attorney, Agent, or Firm* — Fox Rothschild LLP; Robert J. Sacco; Carol E. Thorstad-Forsyth (57) ABSTRACT

Audio output of a radio frequency (RF) portable communication device is controlled. A first portable communication device (PCD) uses an audio transducer to generate one or more audio tones in response to a voice transmit operation initiated by a user of the first PCD. One or more characteristics of the tone or tones can be selectively controlled in accordance with a first talk group which is in use by the first PCD to facilitate the voice transmit operation. The one or more audio tones are received at one or more second PCDs different from the first PCD, where they are used to selectively control an audio output volume of the second PCD.

26 Claims, 6 Drawing Sheets

MITIGATING ECHO AND SPURIOUS AUDIO NOISES IN RADIO COMMUNICATION SYSTEMS

BACKGROUND

Statement of the Technical Field

The technical field of this disclosure concerns radio communication systems, and more particularly methods and systems for reducing the presence of certain types of spurious audio outputs which can occur when transceivers are in close proximity.

Description of the Related Art

Radio transceivers are commonly used by first responders, public service and military personnel to maintain communications among team members. Personnel may often carry personal communication devices in the form of portable radio transceivers to facilitate dismounted operations. Given the nature of these communication systems and the organization of the agencies that use them, it is common for multiple users to be part of the same talk group. Multiple users who are part of the same talk group can use their communication devices to speak to all other members of the talk group. Further, all members of the talk group will hear the radio communications associated with other users in the same talk group.

In recent years there has been a growing trend toward the use of digital communication systems. For example, these systems may employ a conventional digital two-way radio communication standard such as TETRA (Terrestrial Trunked Radio) or Project 25 (P25). Digital communication systems have many advantages over conventional analog radio communication systems. For example, the use of vocoders can facilitate excellent audio quality and various digital error correction schemes. These systems also facilitate trunking and the implementation of talk groups. These systems can introduce a certain amount of processing delay in each communication, but these delays are generally negligible and typically go unnoticed by users.

The Larsen effect is well known in the field of audio systems. This phenomena can result when a sound loop exists between an audio input and an audio output of an electronic audio system. If the electronic audio system characteristics include a positive loop gain between the audio input to the system and the audio output of the system, spurious output sounds can be produced by the system. This condition, which is sometimes referred to as acoustic feedback (or more simply as feedback) is annoying to users and interferes with the proper operation of the equipment.

SUMMARY

This document concerns a method for controlling an audio output of a radio frequency (RF) portable communication device. A first portable communication device (PCD) uses an audio transducer to generate one or more audio tones in response to a voice transmit operation initiated by a user of the first PCD. One or more characteristics of the tone or tones can be selectively controlled in accordance with a first talk group which is in use by the first PCD to facilitate the voice transmit operation. The one or more audio tones are received at one or more second PCDs different from the first PCD, where they are used to selectively control an audio output volume of the second PCD.

According to one aspect, the first talk group is selected from among a plurality of talk groups which may be assigned to the PCD to facilitate a communication session. Further, the one or more audio tones can comprise ultrasonic tones such that they are inaudible to the human ear when produced by the first PCD.

In some scenarios, the one or more audio tones can include a first tone which is a synchronization tone having a predetermined frequency, and a second tone which follows the first tone. The second tone can be an information tone that is controlled to have a frequency that is different from a frequency of the first tone. In this regard, the second tone may be an information tone in which the tone characteristic specifies a talk group in use by the first PCD.

The one or more tone characteristics used to identify a talk group can be selected from the group consisting of a frequency of the audio tone, an amplitude modulation pattern applied to the audio tone, and a frequency modulation pattern applied to the audio tone. According to one aspect, the characteristic may be comprised of a pattern of modulation applied to the audio tone, and the pattern of modulation can represent certain digital data. In such a scenario, a security measure can be advantageously implemented to prevent unauthorized control of the audio output volume of the second PCD. For example, the security measure can involve encrypting the digital data encoded in the tone, the use of a message digest, and/or a time synchronization technique.

When the one or more audio tones are detected in the second PCD, they can be processed to facilitate selective control of an audio output of an RF transceiver associated with the second PCD. This processing can involve extracting from the one or more audio tones certain information which indicates the talk group that is in use by the first PCD. The second PCD can also evaluate a received signal strength of the one or more audio tones to determine an audio output volume adjustment to be automatically applied to the second PCD. For example, the audio output volume adjustment in the second PCD can involve actions to prevent an adverse effect upon the voice transmit operation of the first PCD. Such adverse effects can include an echo effect during the voice transmit operation, and an occurrence of the Larsen effect. The audio output volume of the second PCD can be automatically restored to a previously applied volume set by a user when the one or more tones from the first PCD are no longer detected in the second PCD.

According to a further aspect, a solution disclosed herein can involve a portable communication device (PCD). The PCD can include a radio transceiver, an audio transducer for producing audio tones, and a control unit comprised of an electronic circuit. The control unit is advantageously configured to form certain actions to facilitate the method described above. For example, these actions can involve determining when the radio transceiver has been activated to facilitate a voice transmit operation and, in response to such determination, causing the audio transducer to generate at least one audio tone (e.g., an ultrasonic audio tone) during a period of time associated with the voice transmit operation.

The control unit is further configured to selectively control one or more characteristics of the audio tone(s). For example, in some scenarios, the one or more characteristics of the audio tone or tones can be controlled in accordance with a talk group which is in use by the PCD to facilitate the voice transmit operation. In this way, the one or more audio tones may be configured to selectively control an audio output volume of at least a second PCD. The control unit can also be configured to apply at least one security measure to the one or more audio tones as described herein so as to prevent unauthorized control of the audio output volume of the second PCD.

A solution can also involve a communication system including the PCDs described herein. In such a scenario, the second PCD can comprise a second radio transceiver, an audio sensor; and a second control unit. The second control unit is responsive to the one or more audio tones detected to selectively control the audio output volume of the second PCD. For example, the second control unit may be configured to determine the talk group of the PCD which is transmitting based on the characteristic of the one or more audio tones. Thereafter, the second control unit can selectively adjust the audio output volume of the second PCD based on a comparison of the talk group of the transmitting PCD with a second talk group in use by the second PCD.

BRIEF DESCRIPTION OF THE DRAWINGS

This disclosure is facilitated by reference to the following drawing figures, in which like numerals represent like items throughout the figures, and in which.

DETAILED DESCRIPTION

It will be readily understood that the solution described herein and illustrated in the appended figures could involve a wide variety of different configurations. Thus, the following more detailed description, as represented in the figures, is not intended to limit the scope of the present disclosure, but is merely representative of certain implementations in various different scenarios. While the various aspects are presented in the drawings, the drawings are not necessarily drawn to scale unless specifically indicated.

The methods and/or systems disclosed herein may provide certain advantages in a communication network, for reducing spurious radio-to-radio induced audio noises. These noises can include unwanted echoing and/or ringing noises associated with the Larsen Effect which are output from loudspeaker of the radio. The ringing noise associated with the Larsen Effect is sometimes described as audio feedback and may involve an audible screeching or squealing sound. These spurious effects are detrimental to a communication system as they can result in missed critical communications, the necessity for a user adjustment of the radio equipment, and/or a loss of confidence in the communication equipment.

Echo in the context of a radio transceiver is a phenomena which can occur when a microphone of a transmitting radio is in close proximity to a loudspeaker of a separate receiving radio, where the receiving radio receives the source transmission from the transmitting radio. The microphone of the transmitting radio picks up the audio from the nearby receiving radio, but with a slight delay. The delayed audio is then picked up by the microphone of the transmitting radio and is made part of the source audio being transmitted. The result is such that a user who is listening to the transmission will hear the source audio twice. In a digital system, this phenomena can be caused by signal processing delays. Echo is annoying and can create real problems in a communication system. For example, it can result in radio users not understanding communications or missing critical information in a voice transmission. Within the context of public safety and public works environments, it is common for many radio users to be in close proximity. So this close proximity has a significant potential to produce unwanted echo within radio transmissions.

Figure 1:
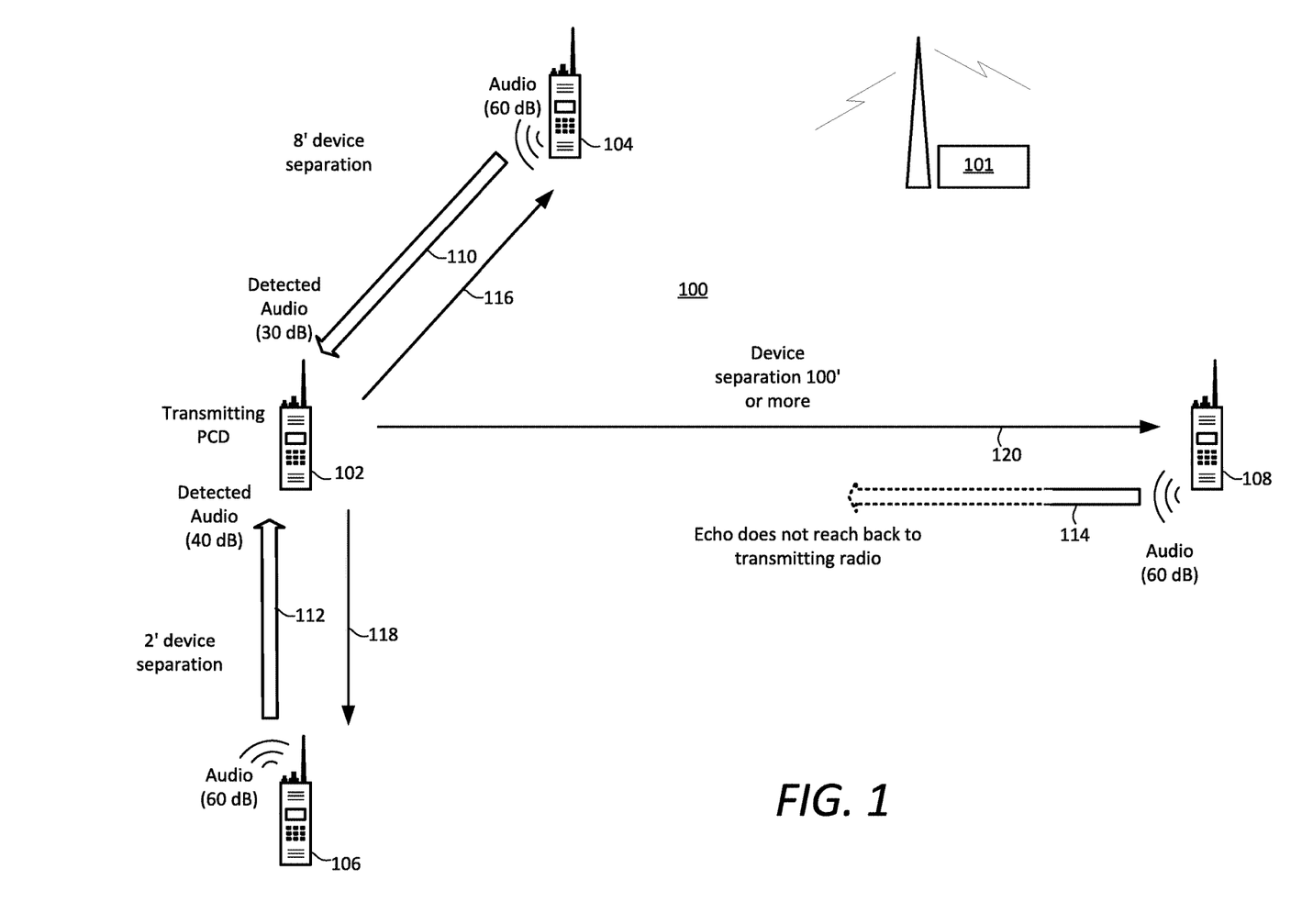
FIG. 1 is a drawing which is useful for understanding certain audio interference problems which can exist when two or more portable communication devices are located in close physical proximity.

The radio echo problem can be understood with reference to FIG. 1, which shows a communication system 100. The communication system is comprised of a plurality of portable communication devices (PCDs) 102, 104, 106, 108. The PCDs 102-108 comprise radio transceivers to facilitate communications among a plurality of users and/or with a central dispatch station 101. Radio systems of this type are well known and are sometimes referred to as Land Mobile Radios (LMR). Modern LMR radios commonly function in accordance with a digital LMR communications protocol such as P25 and/or TETRA (Terrestrial Trunked Radio). These communication protocols are well-known in the art and therefore will not be described here in detail. However, it will be understood that such a communication system can implement one or more talk groups whereby multiple users assigned to a particular talk group can all hear radio transmissions that are directed to members of the particular talk group.

In the example shown in FIG. 1, a PCD 102 is engaged in a voice transmission as part of a radio communication session. The transmission is processed within the communication system 100 such that the radio communication is wirelessly received by each of the PCDs 104-108. Each of the PCDs 104-108 will play the received audio from a respective loudspeaker (not shown) that is associated with each PCD. For the purposes of this example, assume that the loudspeaker associated with each of the PCDs 104-108 reproduces the audio at a sound level of 60 dB. Further, assume that the PCDs 104-108 are in close proximity to the transmitting radio, but each is at a different distance. For the purposes of this illustration, assume that this distance is 8 feet for PCD 104, 2 feet for PCD 106, and 100 feet or more for PCD 108. In this scenario, audio 110 emanating from PCD 104 will be detected at the transmitting PCD 102 at a sound level of 30 dB, and audio 112 emanating from PCD 106 will be detected at transmitting PCD 102 at a sound level of 40 dB. The audio from PCDs 104, 106 will be detected by a microphone associated with PCD 102 and will be incorporated into the audio contained in radio signals 116, 118, 120 transmitted from PCD 102. When these radio signals are received at the PCDs 104-108 they will contain an audio echo due to the audio signals 110, 112 associated with PCDs 104, 106. Note that the audio output from PCD 108 does not get detected by PCD 102 since PCD 108 is too far away in distance from PCD 102.

The proximity of the radios shown in FIG. 1 can similarly causes audio feedback (the Larsen effect) which occurs when a sound loop exists between a microphone and a speaker. A positive loop gain will cause a resonant harmonic signal to become amplified within the sound, whereby the original audio becomes unrecognizable when it is reproduced. The problems described above involving echo and the Larsen effect can be reduced by the use of digital signal processing, but cannot effectively remove the Larsen effect when PCDs are within a close proximity.

A solution for preventing audio feedback and echo can involving automatically controlling an audio output of a PCD that is in close physical proximity to a first PCD that is actively engaged in transmitting a voice communication. For the purposes of this discussion, close physical proximity can be understood as referring to a distance between PCDs that is sufficiently small so as to create a potential for the types of audio feedback and echo issues described herein. Usually such distance will be about 100 feet or less.

Figure 2:
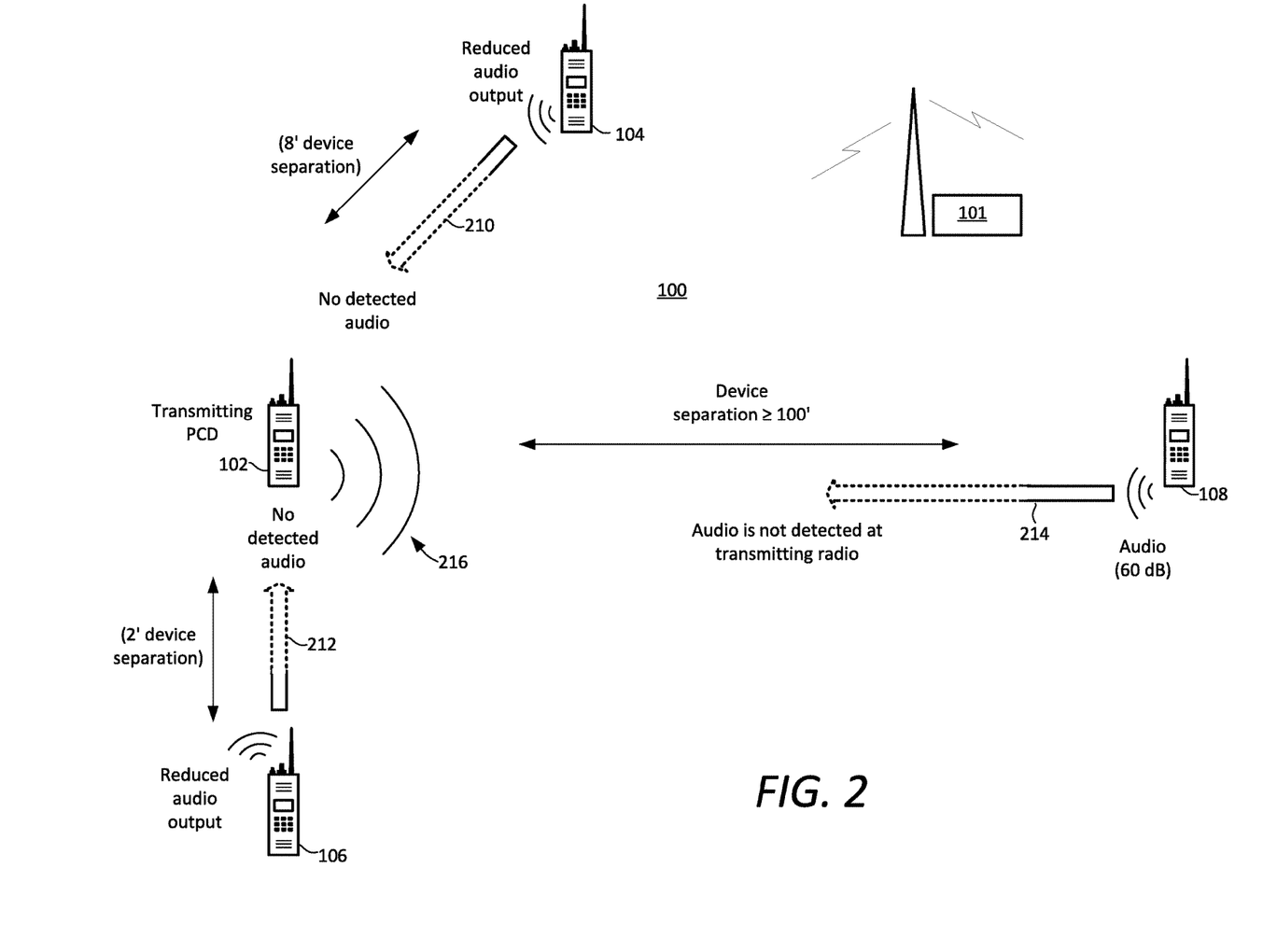
FIG. 2 is a drawing which is useful for understanding a solution for preventing audio interference problems which can exist when two or more portable communication devices are located in close physical proximity.

Referring now to FIG. 2, a first PCD 102 can be in relatively close proximity to PCD 104 and a PCD 106. In the example shown the PCD 104 is 8 feet from the PCD 102, and the PCD 106 is 2 feet away from PCD 102. A third PCD 108 is not in close proximity as it is greater than 100 feet from the PCD 102. In the scenario shown in FIG. 2, an audio transducer (not shown) in a first PCD 102 is used to directly generate one or more audio tones 216 in response to a voice transmit operation initiated by a user of the first PCD. In some scenarios, the audio tones 216 can be an ultrasonic audio tones. Ultrasonic audio tones are well-known in the art and will not be described here in detail. However, it should be understood that the ultrasonic tones will generally have a frequency which is higher than the upper range of human hearing. For example, in some scenarios the ultrasonic sound used for the purposes described herein can have any audio frequency which is greater than about 20,000 Hz. These audio tones will propagate within an area proximal to the first PCD and can be detected by a second PCD (e.g., PCD 104 and/or 106) in relatively close proximity to the first PCD. As explained below, the first PCD 102 controls or uses one or more predetermined characteristics of the one or more audio tones to facilitate control of a radio transceiver audio output volume of the second PCD.

The specific characteristic of the audio tone that is used to facilitate the control operations described herein is not critical. According to one aspect, the one or more tone characteristics described herein can be a frequency of the one or more audio tones, an amplitude modulation pattern applied to the one or more audio tones, and/or a frequency modulation pattern applied to the one or more audio tones. However, the solution is not limited in this regard and any other variable characteristic of the tones can be used for the purposes described herein. The one or more characteristics of the audio tone(s) are advantageously controlled or modified by the first PCD 102 in accordance with a first talk group which is in use by the first PCD 102 to facilitate the voice transmit operation.

As is known, a first talk group assigned to a PCD can be selected from among a plurality of talk groups associated with an LMR communication system 100 to facilitate a communication session. In a solution described herein, the first PCD 102 can use the audio tone characteristic to communicate certain information to other PCDs 104, 106 that are in close physical proximity. For example, this audio communication technique can be used convey information which specifies the particular talk group which the first PCD 102 is currently using for voice transmit operations. PCDs which are not in close proximity (e.g. PCD 108) will not receive the one or more audio tones 216 and therefore will not adjust their transceiver audio output. However, this is acceptable in the example shown in FIG. 2 because the first PCD 102 is too far away from PCD 108 to be adversely affected by the transceiver audio output from PCD 108.

In a solution described herein, the audio tone characteristic can be modified, controlled or coded in accordance with a particular talk group that the first PCD 102 is using for voice transmit operations. In this way, the first PCD 102 can signal to other PCDs 104, 106 in close proximity that a particular talk group is being used by the first PCD. A second PCD 104, 106 in close physical proximity to the first PCD 101 can detect the one or more audio tones 216. The second PCD 104, 106 can then determine a talk group of the first PCD 102 based on the detected tone characteristic. The second PCD 104, 106 can then use this information to determine whether it is actively assigned to the same talk group as the first PCD. If assigned to the same talk group, then the second PCD 104, 106 can perform certain actions to mitigate against possible audio effects such as echo and audio feedback.

For example, in some scenarios a second PCD 104, 106 assigned to the same talk group as a nearby first PCD 102 that is transmitting can be configured to selectively respond to the audio tones by reducing output audio from a radio transceiver. As such, the one or more audio tones of the first PCD 102 can be used to selectively control a radio transceiver audio output volume of one or more second PCD 104, 106. In some scenarios, the control of the audio output volume can be a fixed predetermined reduction in the audio output volume. However, in other scenarios the PCD which receives the audio tones can automatically selectively reduce the audio output volume associated with a radio transceiver. The reduction in output volume can be in accordance with a magnitude of a detected audio power of the received audio tone(s). For example, the magnitude of the audio output power from the second PCD can be varied in a way that is inversely proportional to the power level of the detected audio tones.

The exact configuration of the audio tones and/or tone characteristics used to facilitate the control operations described herein is not critical. The tones and/or tone characteristics can be configured and/or used in many different ways to facilitate the solution described and all such solutions are intended to be included within the scope of the invention. For example, in some scenarios the one or more audio tones can include a first tone which is a synchronization tone having a predetermined frequency, and a second tone which follows the first tone. In such a scenario, the tone characteristic of the fist tone can be used to alert a second PCD that the first PCD is transmitting, and the tone characteristic of the second tone can be controlled to specify the talk group of the PCD that is transmitting. For example, the tone characteristic associated with the first and second tone can be tone frequency. The first tone will have a first predetermined tone frequency and the second tone will have a tone frequency determined in accordance with a talk group in use by the first PCD. In such a scenario, the frequency of the second tone specifies the talk group of the first PCD which is transmitting. As such, the second tone serves as an information tone in which the tone characteristic specifies a talk group in use by the first PCD. This solution can be understood with reference to FIG. 3.

Figure 3:
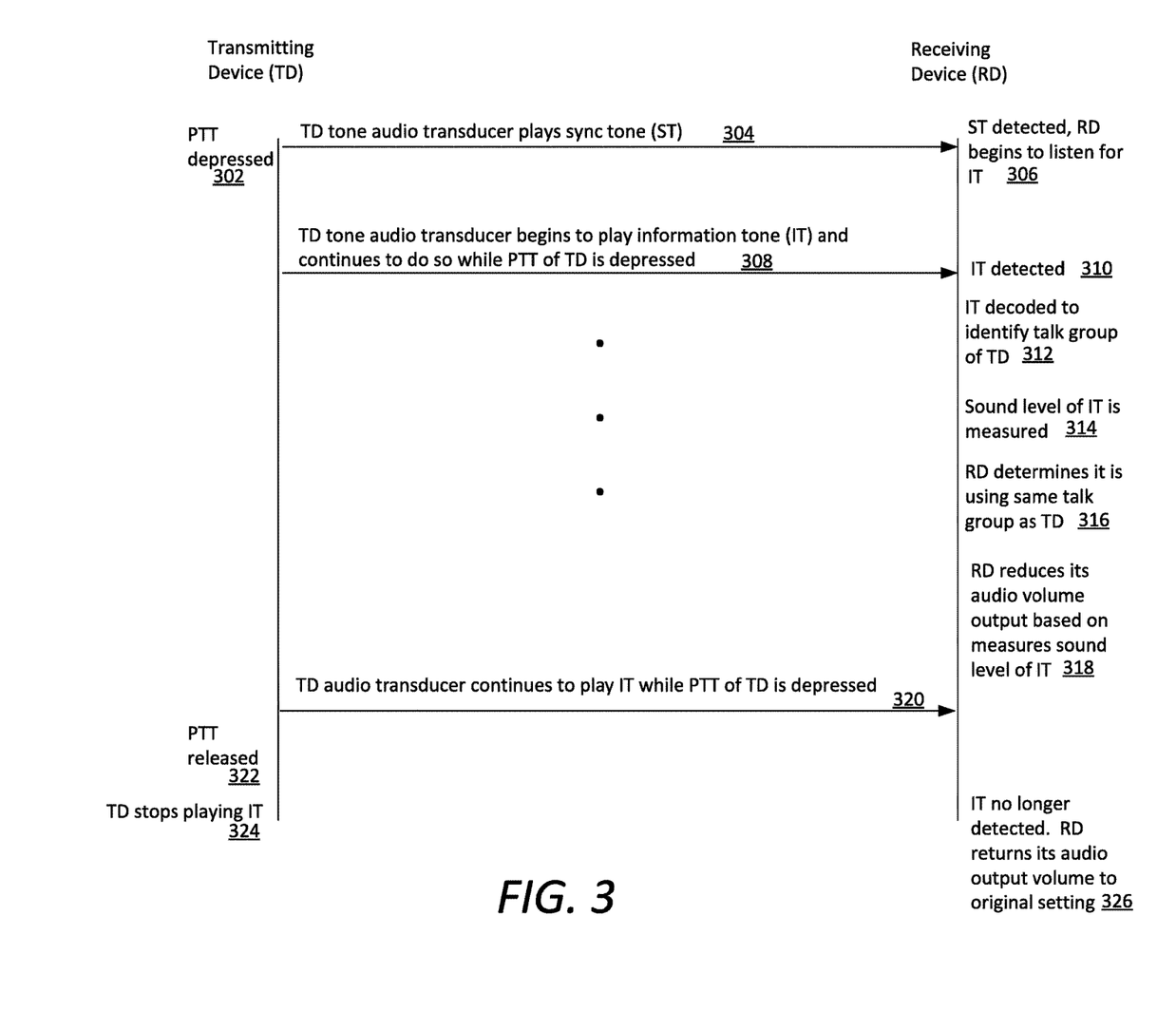
FIG. 3 is a process flow diagram which is useful for understanding an interaction among two or more portable communication devices in FIG. 2 in a first scenario.

The process can begin at 302 when a voice transmission is initiated by a user of a first PCD (e.g., PCD 102) which is also sometimes referred to herein as a transmitting device (TD). In some scenarios, this step can involve assertion (by the user) of a Push-to-Talk (PTT) button on the device to initiate the voice transmission. However, the solution is not limited in this respect. For example, in some scenarios a voice transmission can be voice operated transmission (VOX) whereby the first PCD detects when the user begins speaking and initiates a transmit operation.

In response to the initiation of the voice transmission, the transmitting device (PCD 102 in this example) will begin generating or playing at 304 an audio synchronization or sync tone (ST). The audio ST is advantageously selected to comprise an ultrasonic audio tone so that it is not audible to the human ear. At 306 the ST will be detected or received by a second PCD (e.g., PCD 104 and/or PCD 106) in relatively close proximity to the transmitting device. For convenience a PCD which receives the ST will sometimes be referred to herein as a receiving device (RD). When the ST is detected at 306, the receiving device (e.g., PCD 104, 106) will be caused to listen for the second audio tone, which in this example is an information tone (IT).

At 308, the audio transducer at the transmitting device (e.g., PCD 102) begins to generate or play the information tone and can continue to do so while the PTT of the transmitting device is asserted. At 310 the information tone is detected at the receiving device and is subsequently decoded at 312. At 314 a sound level or power level associated with the detected tone or tones is measured. At 316, the receiving device (e.g., PCD 104, 106) which has detected the presence of the tone or tones will determine talk group information of the transmitting device based on the one or more characteristic of the information tone. For example, the receiving device can determine that a particular information tone specifies a particular talk group based on a frequency of the information tone. The receiving device then compares this information to an internal database or look-up-table to determine whether the receiving device is assigned to the same talk group.

In the scenario shown in FIG. 3, the receiving device (e.g., PCD 104, 106) is assigned to the same talk group as the transmitting device (e.g., PCD 102). Accordingly, the receiving device reduces its transceiver audio output volume at 318. The amount of reduction is based on the measure sound level of the one or more tones (e.g., a measured sound level of an information tone). The audio output volume adjustment is advantageously selected to prevent an adverse effect upon the voice transmit operation, where the adverse effect may involve a resulting echo during the voice transmit operation, and/or an occurrence associated with the Larsen effect.

Sound levels of audio tones generated by a transmitting device (e.g., PCD 102) will decrease in a known way with distance relative to a source. For example, sound pressure level (SPL) will decrease by 3 dB as distance is doubled. The sound intensity decreases in accordance with the ratio 1/r with respect to distance, where r represents distance to the source. So if the output of a tone audio transducer is known in advance, then a receiving device (e.g., PCD 104, 106) can estimate a distance from a transmitting device. According to one aspect, the receiving device accomplishes this by evaluating the sound pressure level or sound intensity of a detected audio tone at the receiving device.

The particular tone that is evaluated for distance estimating purposes is not critical. As such, the sound level of a synchronization tone, an information tone, or both tones can be used to estimate a distance from a transmitting device which is a source of the audio tone. In the solution disclosed herein, a greater magnitude of sound intensity of a detected audio tone will result in a greater decrease in the audio output volume of the second PCD. Stated differently, the audio output power level of the receiving device is advantageously adjusted so that its radio transceiver audio output level is inversely proportional to the detected power level of the received tone.

While the foregoing adjustments are proceeding, the transmitting device (e.g. PCD 102) can continue to generate the information tone as illustrated at 320 in FIG. 3. In this regard it should be understood that the information tone can in some scenarios be a single long continuous tone during the voice transmission from the transmitting device. However, in other scenarios, the information tone may not be continuous but can instead be repeated continually at regular frequent intervals during the voice audio transmission. If repeated at regular frequent intervals, then the intervals between repeated tones should be of relatively short duration. In this way, a receiving device can quickly determine with certainty when the transmitting device has stopped playing the tone in response to a user releasing a PTT switch.

At a certain time the user at the transmitting device (e.g., PCD 102) will terminate the voice transmission by releasing a PTT switch at 322. When this occurs, the PCD will discontinue playing of the information tone at 324. Consequently, the information tone will no longer be detected at the receiving device. When this occurs, the receiving device will readjust 326 the audio output from its transceiver so that the audio output volume is returned to its original setting before the automatic adjustment process described herein was initiated.

Figure 4:
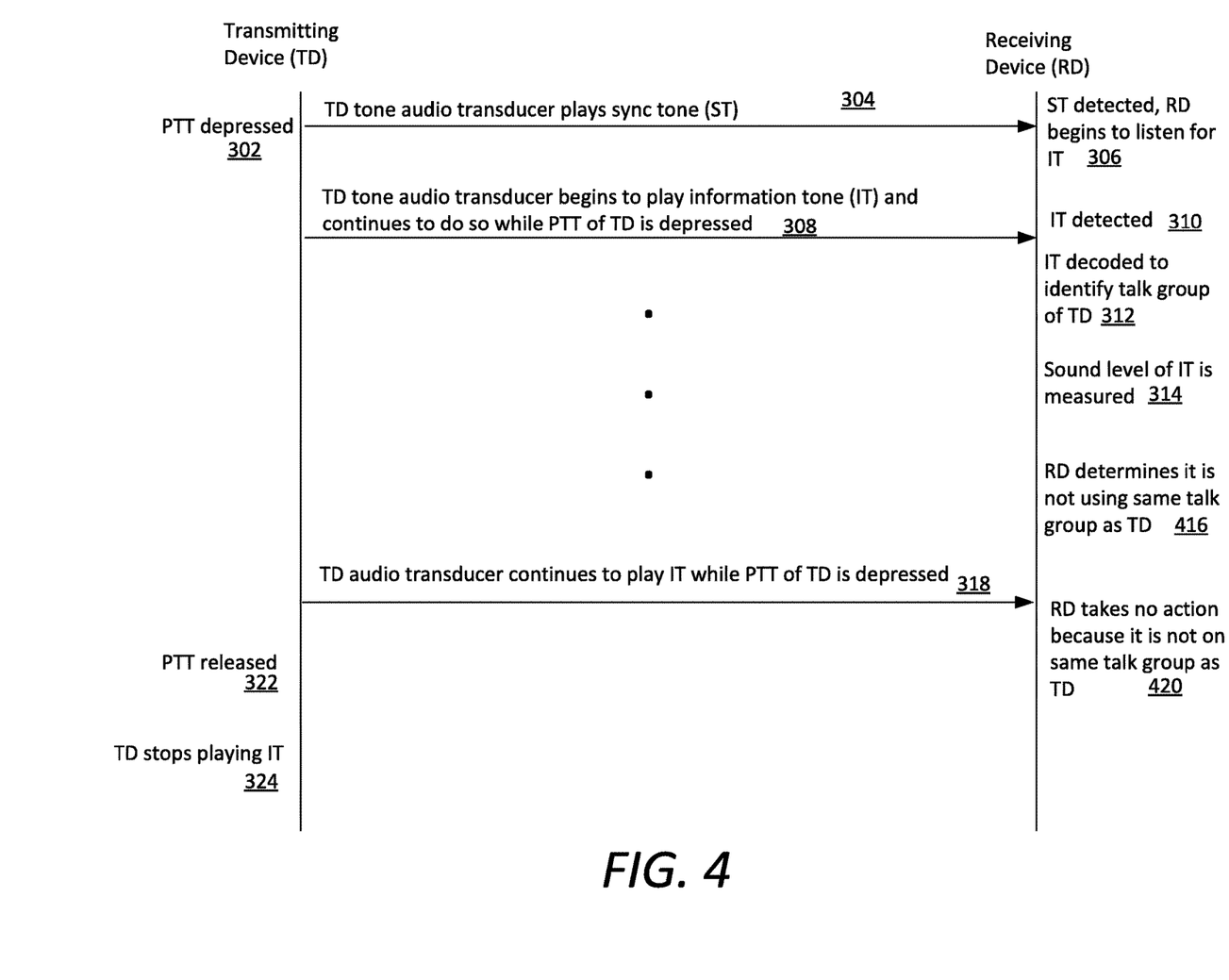
FIG. 4 is a process flow diagram which is useful for understanding an interaction among two or more portable communication devices in FIG. 2 in a second scenario.

The process in FIG. 4 is similar to FIG. 3. The transmitting device (e.g., PCD 102) generates an sync tone at 304 in response to a PTT assertion at 302. The receiving device (e.g., PCD 104, 106) detects the sync tone at 306. The transmitting device plays an information tone at 308. The receiving device detects the information tone at 310, and decodes the information tone to identify a talk group of the transmitting device at 312. The receiving device can also measure a magnitude of a sound level or intensity of the information tone at 314. However, in this scenario the receiving device (e.g., PCD 104, 106) determines at 416 that it is not using the same talk group as the transmitting device (e.g., PCD 102). Consequently, the receiving device takes no action at 420 because it is not in the same talk group as the transmitting device. Sometime later, the PTT of the transmitting device is released at 322 and the transmitting device stops playing the information tone at 324.

Figure 5:
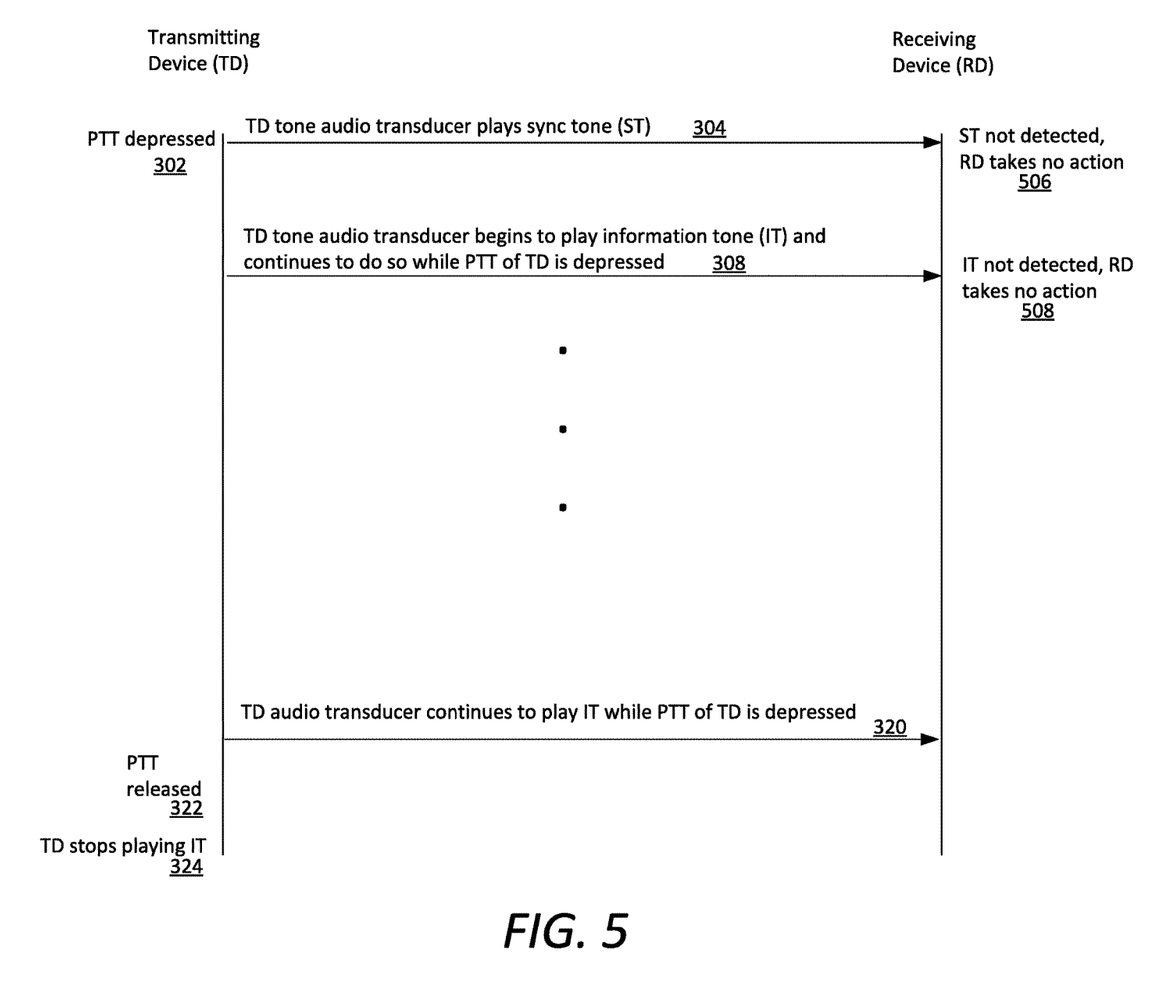
FIG. 5 is a process flow diagram which is useful for understanding an interaction among two or more portable communication devices in FIG. 2 in a third scenario.

The process in FIG. 5 is similar to that which is described in FIGS. 3 and 4 except that in this example the receiving device (e.g., PCD 108) is too distant from the transmitting device to detect the ultrasonic tones that are generated by the transmitting device (e.g., PCD 102). The synchronization tone generated by the transmitting device (e.g., PCD 102) at 304 is not detected at the receiving device. Consequently, the receiving device takes no action at 506. Similarly, the receiving device does not detect the information tone at 508, and again takes no action to reduce an audio output from its radio transceiver. Note also that no reduction in audio output is needed with respect to the receiving device in this scenario since it is too far from the transmitting device to create an adverse impact upon voice transmissions from the transmitting device.

As noted above, tone characteristic can in some scenarios be comprised of a pattern of modulation that is applied to the one or more of the audio tone produced by a transmitting device. In such a scenario, the applied modulation pattern can be used to facilitate communication of digital data to the receiving device. This digital data can serve various purposes in connection with the solution described herein. For example, in some scenarios the digital data can be used to facilitate at least one security measure which is configured to prevent spoofing or unauthorized control of the audio output volume of the second PCD. For example, the security measure can involve an encryption-based solution in which the digital data is encrypted. In such a scenario, the transmitting device and the receiving device can each have an a key to facilitate encryption and decryption of digital data.

As another example, the security measure can involve the use of a message digest. As is known, a message digest can comprise a value computed by a hash function which is determined based on the contents of a message. A type of digital signature can be created by encrypting the results of the hash function. So digital data messages communicated as part of the one or more audio tones described herein can be verified when received by a receiving device. Still another example could involve a time synchronization technique. As is known, time synchronization as between a transmitting device and a receiving device can be used to validate a digital certificate where the certificate must include the present time within a valid range. Time synchronization information encrypted in the one or more audio tones can also prevent replay attacks whereby someone might record the one or more audio tones and replay them to spoof a receiving device. Of course, these examples are not intended to limit the types of security measures that can be incorporated in the system when the one or more audio tones are modulated with digital data. Instead, it should be understood that the security measures can include any type of security technique now known or known in the future, which can be implemented in a digital data communication system.

Figure 6:
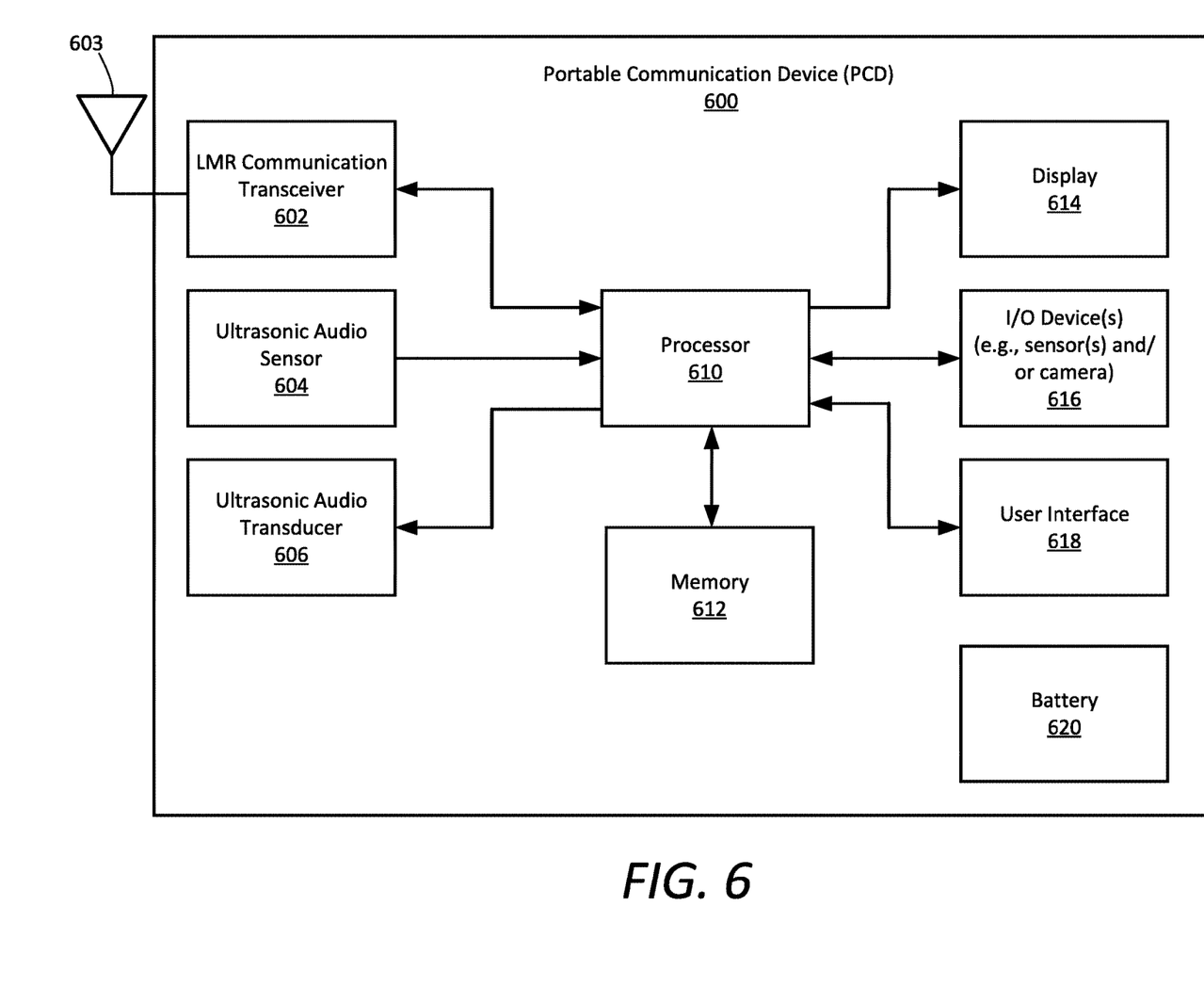
FIG. 6 is an architectural block diagram which is useful for understanding a configuration of a portable communication device.

Referring now to FIG. 6, there is provided an illustration of an example architecture for a PCD 600 which is configured for carrying out the various methods described herein. The PCDs 102-108 of FIGS. 1 and 2 can be the same as or similar to PCD 600. As such, the discussion of PCD 600 is sufficient for understanding PCDs 102-108 of FIGS. 1 and 2. PCD 600 can include more or less components than that shown in FIG. 6 in accordance with a given application. For example, PCD 600 can include one or both components 608 and 610. The present solution is not limited in this regard.

As shown in FIG. 6, the PCD 600 comprises an LMR communication transceiver 602 coupled to an antenna 603. The LMR communication transceiver can comprise one or more components such as a processor, an application specific circuit, a programmable logic device, a digital signal processor, or other circuit programmed to perform the functions described herein. The communication transceiver 602 can enable end-to-end LMR communication services in a manner known in the art. In this regard, the communication transceiver can facilitate communication of voice data from the PCD 600 over an LMR network (e.g., network 100 of FIG. 1). The PCD 600 also comprises an ultrasonic audio sensor or detector 604 and an ultrasonic audio transducer 606.

Although the PCD 600 has been described herein as comprising an LMR communication transceiver, it should be understood that the solution is not limited in this regard. In some scenarios, the communication network 100 can comprise a cellular communication network instead of an LMR type network. In that case, the PCD 600 could include a cellular network communication transceiver in place of an LMR transceiver. In another scenario, the PCD could include both an LMR transceiver and a cellular transceiver. In this regard it should be understood that the solutions described herein can be implemented in an LMR communication network, a cellular communication network or communication systems that combine aspects of both types of systems.

The above-described communication components 602-606 are connected to the processor 610 comprising an electronic circuit. During operation, the processor 610 is configured to control the LMR communication transceiver 602 for providing LMR services. The processor 610 can also receive signals from ultrasonic audio sensor 604 corresponding to detected ultrasonic tones. These audio signals can be converted to electronic analog signals by the ultrasonic audio sensor 604. The electronic analog signals can be subsequently analyzed in the processor to determine certain information or characteristics associated with the detected audio tone. This information or characteristic can comprise tone frequency, detected tone power level, sound pressure level, and/or sound intensity. The processor 610 can also be configured to extract information pertaining to a modulation pattern which has been applied to the tone. The processor 610 can also control the operation of the ultrasonic audio transducer 606. The audio transducer is an electro-acoustic device responsive to processor so as to produce ultrasonic audio output in response to applied electronic signals. In this regard, the processor 610 can control electronic signals applied to the audio transducer to determine a tone power level, a tone frequency, and/or a modulation pattern applied to an audio tone produced by the audio transducer.

A memory 612, display 614, user interface 618 and Input/Output ("I/O") device(s) 616 are also connected to the processor 610. The processor 610 may be configured to collect and store data generated by the I/O device(s) 616 and/or external devices (not shown). Data stored in memory 612 can include, but is not limited to one or more look-up tables or databases which facilitate determination of a talk group corresponding to a particular ultrasonic tone. As such, the data can include values representing a plurality of ultrasonic frequency tones, and information specifying a plurality of talk group. The user interface 618 includes, but is not limited to, a plurality of user depressible buttons that may be used, for example, for entering numerical inputs and selecting various functions of the PCD 600. This portion of the user interface may be configured as a keypad. Additional control buttons and/or rotatable knobs may also be provided with the user interface 622. A battery 620 may be provided for powering the components of the PCD 600. The battery 620 may comprise a rechargeable and/or replaceable battery. Batteries are well known in the art, and therefore will not be discussed here.

The PCD architecture show in FIG. 6 should be understood to be one possible example of a PCD system which can be used in connection with the various implementations disclosed herein. However, the systems and methods disclosed herein are not limited in this regard and any other suitable PCD system architecture can also be used without limitation. Applications that can include the apparatus and systems broadly include a variety of electronic and computer systems. In some scenarios, certain functions can be implemented in two or more specific interconnected hardware modules or devices with related control and data signals communicated between and through the modules, or as portions of an application-specific integrated circuit. Thus, the exemplary system is applicable to software, firmware, and hardware implementations.

As used in this document, the singular form "a", "an", and "the" include plural references unless the context clearly dictates otherwise. Unless defined otherwise, all technical and scientific terms used herein have the same meanings as commonly understood by one of ordinary skill in the art. As used in this document, the term "comprising" means "including, but not limited to".

Although the systems and methods have been illustrated and described with respect to one or more implementations, equivalent alterations and modifications will occur to others skilled in the art upon the reading and understanding of this specification and the annexed drawings. In addition, while a particular feature may have been disclosed with respect to only one of several implementations, such feature may be combined with one or more other features of the other implementations as may be desired and advantageous for any given or particular application. Thus, the breadth and scope of the disclosure herein should not be limited by any of the above descriptions. Rather, the scope of the invention should be defined in accordance with the following claims and their equivalents.

We claim:

1. A method for controlling an audio output of a radio frequency (RF) portable communication device, comprising:
   in a first portable communication device (PCD) using an audio transducer to generate at least one audio tone in response to a voice transmit operation initiated by a user of the first PCD, the audio tone being generated independent from a voice communication transmitted during the voice transmit operation;
   selectively controlling at least one characteristic of the at least one audio tone in accordance with a first talk group which is in use by the first PCD to facilitate the voice transmit operation; and
   using the at least one audio tone to selectively control an audio output volume of at least a second PCD different from the first PCD.

2. The method of claim 1, wherein the first talk group is selected from among a plurality of talk groups which may be assigned to the PCD to facilitate a communication session.

3. The method of claim 1, wherein the at least one audio tone is an ultrasonic tone.

4. The method of claim 1, wherein the at least one characteristic is selected from the group consisting of a frequency of the audio tone, an amplitude modulation pattern applied to the audio tone, and a frequency modulation pattern applied to the audio tone.

5. The method of claim 1, further comprising detecting the at least one audio tone in the second PCD, and selectively controlling an audio output of the second PCD in response to the at least one audio tone.

6. The method of claim 5, further comprising processing the at least one audio tone in the second PCD to extract information which indicates the talk group that is in use by the first PCD.

7. The method of claim 5, further comprising evaluating a received signal strength of the at least one audio tone to determine an audio output volume adjustment to be automatically applied to the second PCD.

8. The method of claim 7, further comprising selecting the audio output volume adjustment to prevent an adverse effect upon the voice transmit operation, the adverse effect selected from the group consisting of an echo during the voice transmit operation, and an occurrence of the Larsen effect.

9. A method for controlling an audio output of a radio frequency (RF) portable communication device, comprising:
   in a first portable communication device (PCD) using an audio transducer to generate at least one audio tone in response to a voice transmit operation initiated by a user of the first PCD;
   selectively controlling at least one characteristic of the at least one audio tone in accordance with a first talk group which is in use by the first PCD to facilitate the voice transmit operation; and
   using the at least one audio tone to selectively control an audio output volume of at least a second PCD different from the first PCD;
   wherein the at least one audio tone is selected to include a first tone which is a synchronization tone having a predetermined frequency, and a second tone which follows the first tone.

10. The method of claim 9, wherein the second tone is an information tone that is controlled to have a frequency different than the first tone.

11. The method of claim 9, wherein the second tone is an information tone in which the at least one characteristic specifies a talk group in use by the first PCD.

12. A method for controlling an audio output of a radio frequency (RF) portable communication device, comprising:
   in a first portable communication device (PCD) using an audio transducer to generate at least one audio tone in response to a voice transmit operation initiated by a user of the first PCD;
   selectively controlling at least one characteristic of the at least one audio tone in accordance with a first talk group which is in use by the first PCD to facilitate the voice transmit operation; and
   using the at least one audio tone to selectively control an audio output volume of at least a second PCD different from the first PCD;
   wherein the at least one characteristic is comprised of a pattern of modulation applied to the at least one audio tone, and the pattern of modulation comprises digital data.

13. The method of claim 12, further comprising applying at least one security measure to prevent unauthorized control of the audio output volume of the second PCD.

14. The method of claim 13, further comprising selecting the at least one security measure from the group consisting of encrypting the digital data, making use of a message digest, and a time synchronization technique.

15. A method for controlling an audio output of a radio frequency (RF) portable communication device, comprising:
   in a first portable communication device (PCD) using an audio transducer to generate at least one audio tone in response to a voice transmit operation initiated by a user of the first PCD;
   selectively controlling at least one characteristic of the at least one audio tone in accordance with a first talk group which is in use by the first PCD to facilitate the voice transmit operation;
   using the at least one audio tone to selectively control an audio output volume of at least a second PCD different from the first PCD;
   detecting the at least one audio tone in the second PCD, and selectively controlling an audio output of the second PCD in response to the at least one audio tone; and
   returning the audio output volume to a previously applied volume set by a user when the at least one tone is no longer detected.

16. A portable communication device (PCD), comprising:
a radio transceiver;
an audio transducer; and
a control unit comprising an electronic circuit, the control unit configured to
    determine when the radio transceiver has been activated to facilitate a voice transmit operation;
    cause the audio transducer to generate at least one audio tone during a period of time associated with the voice transmit operation, where the audio tone is generated independent from a voice communication transmitted during the voice transmit operation; and
    selectively control at least one characteristic of the at least one audio tone in accordance with a talk group which is in use by the PCD to facilitate the voice transmit operation, wherein the at least one audio tone is configured to selectively control an audio output volume of at least a second PCD.

17. The PCD of claim 16, wherein the talk group is one of a plurality of talk groups which may be assigned to the PCD to facilitate a communication session.

18. The PCD of claim 16, wherein the at least one audio tone is an ultrasonic tone.

19. The PCD of claim 16, wherein the at least one characteristic is selected from the group consisting of a frequency of the audio tone, an amplitude modulation pattern of the audio tone, and a frequency modulation pattern of the audio tone.

20. A communication system including the PCD of claim 16 and at least the second PCD, wherein the second PCD is comprised of
a second radio transceiver;
an audio sensor; and
a second control unit comprising a second electronic circuit, the second control unit responsive to the at least one audio tone to selectively control the audio output volume of the second PCD.

21. A portable communication device (PCD), comprising:
a radio transceiver;
an audio transducer; and
a control unit comprising an electronic circuit, the control unit configured to
    determine when the radio transceiver has been activated to facilitate a voice transmit operation;
    cause the audio transducer to generate at least one audio tone during a period of time associated with the voice transmit operation; and
    selectively control at least one characteristic of the at least one audio tone in accordance with a talk group which is in use by the PCD to facilitate the voice transmit operation, wherein the at least one audio tone is configured to selectively control an audio output volume of at least a second PCD;
wherein the at least one audio tone includes a first tone which is a synchronization tone having a predetermined frequency, and a second tone which follows the first tone.

22. The PCD of claim 21, wherein the second tone is an information tone which has a frequency different than the first tone.

23. The PCD of claim 21, wherein the second tone is an information tone in which the at least one characteristic is configured to specify the talk group.

24. A portable communication device (PCD), comprising:
a radio transceiver;
an audio transducer; and
a control unit comprising an electronic circuit, the control unit configured to
    determine when the radio transceiver has been activated to facilitate a voice transmit operation;
    cause the audio transducer to generate at least one audio tone during a period of time associated with the voice transmit operation; and
    selectively control at least one characteristic of the at least one audio tone in accordance with a talk group which is in use by the PCD to facilitate the voice transmit operation, wherein the at least one audio tone is configured to selectively control an audio output volume of at least a second PCD;
wherein the at least one characteristic is comprised of a pattern of modulation applied to the at least one audio tone, and the pattern of modulation comprises digital data which specifies the talk group.

25. A portable communication device (PCD), comprising:
a radio transceiver;
an audio transducer; and
a control unit comprising an electronic circuit, the control unit configured to
    determine when the radio transceiver has been activated to facilitate a voice transmit operation;
    cause the audio transducer to generate at least one audio tone during a period of time associated with the voice transmit operation; and
    selectively control at least one characteristic of the at least one audio tone in accordance with a talk group which is in use by the PCD to facilitate the voice transmit operation, wherein the at least one audio tone is configured to selectively control an audio output volume of at least a second PCD;
wherein the control unit is configured to apply at least one security measure to the at least one audio tone to prevent unauthorized control of the audio output volume of the second PCD.

26. A communication system, comprising:
a first portable communication device (PCD), comprising:
    a first radio transceiver;
    an audio transducer; and
    a first control unit comprising a first electronic circuit, the first control unit configured to
        determine when the first radio transceiver has been activated to facilitate a voice transmit operation;
        cause the audio transducer to generate at least one audio tone during a period of time associated with the voice transmit operation; and
        selectively control at least one characteristic of the at least one audio tone in accordance with a talk group which is in use by the first PCD to facilitate the voice transmit operation, wherein the at least one audio tone is configured to selectively control an audio output volume of at least a second PCD;
the second PCD comprised of:
    a second radio transceiver;
    an audio sensor; and
    a second control unit comprising a second electronic circuit, the second control unit responsive to the at least one audio tone to selectively control the audio output volume of the second PCD;
wherein the second control unit is configured to determine the talk group of the first PCD based on the at least one characteristic, and selectively adjusts the audio output volume of the second PCD based on a comparison of the talk group with a second talk group in use by the second PCD.

\* \* \* \* \*